United States Patent [19]

Hsieh

[11] Patent Number: 5,120,687
[45] Date of Patent: * Jun. 9, 1992

[54] SIALON CONTAINING HIGH CONTENT OF ALPHA PRIME PHASE

[75] Inventor: Martin Y. Hsieh, Palo Alto, Calif.

[73] Assignee: The Morgan Crucible Company plc, Windsor, England

[ * ] Notice: The portion of the term of this patent subsequent to Oct. 10, 2006 has been disclaimed.

[21] Appl. No.: 374,908

[22] Filed: Jul. 3, 1989

Related U.S. Application Data

[63] Continuation of Ser. No. 127,846, Dec. 2, 1987, Pat. No. 4,873,210.

[51] Int. Cl.$^5$ .............................................. C04B 35/58
[52] U.S. Cl. ......................................... 501/98; 501/94
[58] Field of Search .............................. 501/92, 97, 98

[56] References Cited

U.S. PATENT DOCUMENTS

| | | | |
|---|---|---|---|
| 4,127,416 | 11/1978 | Lumby et al. | 501/98 |
| 4,506,020 | 3/1985 | Butler et al. | 501/98 X |
| 4,547,470 | 10/1985 | Tanase et al. | 501/97 X |
| 4,563,433 | 1/1986 | Yeckley et al. | 501/97 |
| 4,609,633 | 9/1986 | Fukuhara et al. | 501/98 X |

FOREIGN PATENT DOCUMENTS

| | | | |
|---|---|---|---|
| 0123292 | 10/1984 | European Pat. Off. | 501/97 |
| 6124989 | 11/1984 | European Pat. Off. | 501/97 |

OTHER PUBLICATIONS

Zhen-Kun Huang et al., "Formation of Alpha $Si_3N_4$ Solid Solutions in the System $Si_3N_4$–AlN–$Y_2O_3$", Am. Cer. Soc., Jun. 1983, pp. C96–C97.

Primary Examiner—Karl Group
Attorney, Agent, or Firm—Kilpatrick & Cody

[57] ABSTRACT

Silicon aluminum oxynitride materials having high hardness and high density are formed by pressureless sintering of silicon nitride, yttrium oxide and aluminum nitride. The materials contain at least 75 weight percent of alpha prime phase sialon.

1 Claim, 2 Drawing Sheets

SIALON CONTAINING HIGH CONTENT OF ALPHA PRIME PHASE

This application is a continuation of application Ser. No. 07/127,846, filed Dec. 12, 1987, now U.S. Pat. No. 4,873,210.

This invention concerns silicon aluminum oxynitride materials, commonly referred to as sialons. Such materials are disclosed in U.S. Pat. No. 4,127,416. This invention is particularly concerned with articles of such materials formed by pressureless sintering that have high hardness, high density and contain at least about 75% of the alpha prime phase sialon. U.S. Pat. No. 4,563,433 discloses double phase sialons containing 20 to 90 weight percent of beta phase sialon and 10 to 70 weight percent of alpha phase sialon. Z. Huang et al, "Formation of Alpha $Si_3N_4$ Solid Solutions in the System $Si_3N_4$-AlN-$Y_2O_3$." Communications of the American Ceramic Society, June, 1983, pp. C96–C97, discloses compositions containing alpha sialon which were formed by hot pressing.

Sialon articles are being used in various industrial applications, such as cutting tools, blades and wear-resistant parts, as described in U.S. Pat. No. 4,127,416. These articles comprise materials which are predominantly single phase beta sialons, although they may contain up to 20% of an intergranular phase.

Sialons as per the instant invention have higher hardness and higher wear resistance than presently available commercial materials disclosed in U.S. Pat. No. 4,127,416 and 4,563,433. Sialons as per this invention comprise at least about 75% of the alpha prime phase sialon and are located in a small portion of the quasiternary diagram for silicon nitride, aluminum nitride and yttrium oxide. The sialons may also contain a small amount of an intergranular phase which is not detectable by routine x-ray diffraction examination.

In the drawings,

FIG. 1 also shows triangle XYZ which is a small portion of the diagram.

The raw materials used in making sialon articles as per this invention were silicon nitride powder, grade E-10, manufactured by Ube Industries, Ltd., aluminum nitride powder, grade AP-10, manufactured by Denki Kagaku K. K., and yttrium oxide powder, grade 5600, manufactured by Molycorp, Inc.

The process used was to dry ball mill mixtures of the three powders using silicon nitride grinding media. For 100 gram mixtures, 2,000 grams of grinding media were used and milling time was 20 hours. For 400 gram mixtures, 16,000 grams of grinding media were used, and milling time was 36 hours. The milled powder mixtures were then pressed at 20,000 psi into articles such as disks or bars which were then fired in silicon nitride crucibles with their own bedding powder. The samples were fired above 1700° C., typically between 1740° and 1800°. Most studies were concentrated on firing at about 1760° to 1780° C. Samples were held at the sintering temperature for about four hours. The pressureless sintering was done in nitrogen flowing gas at one atmosphere pressure.

The fired materials were evaluated by standard x-ray diffractometer to determine phases present. The x-ray diffraction patterns were recorded by use of a Ni filtered CuK alpha radiation at 45 KV, 10 mA, 1° slit.

EXAMPLE 1

This composition consisted of yttrium oxide, aluminum nitride and silicon nitride at a molar ratio of 1:10:21. X-ray diffraction analysis indicated that this material consisted of about 80 weight percent of the alpha prime phase sialon and about 20 weight percent of beta silicon nitride. This material had a hardness (R45N) of 91.3 psi, a sintered density of 3.247 and a strength (3 pt. bend) of 82,000 psi.

EXAMPLE 2

This composition consisted of yttrium oxide, aluminum nitride and silicon nitride at a molar ration of 1:11:21. The sintered material was about 100% of the alpha prime phase sialon (within X-ray diffraction experimental limits) and had a hardness (R45N) of 91.2 psi, a sintered density of 3.244 and a strength (3 pt. bend) of 80,000 psi.

Table I shows the compositions, in weight percent, of examples within the scope of this invention.

TABLE I

| Example | $Y_2O_3$ | AlN | $Si_3N_4$ |
|---|---|---|---|
| 1 | 6.31 | 11.44 | 82.25 |
| 2 | 6.23 | 12.45 | 81.32 |
| 3 | 5.65 | 11.72 | 82.63 |
| 4 | 6.27 | 11.95 | 81.78 |
| 5 | 6.62 | 12.72 | 80.66 |
| 6 | 7.0 | 13.0 | 80.0 |
| 7 | 6.13 | 12.72 | 81.15 |
| 8 | 5.93 | 12.58 | 81.49 |

Figure 1:
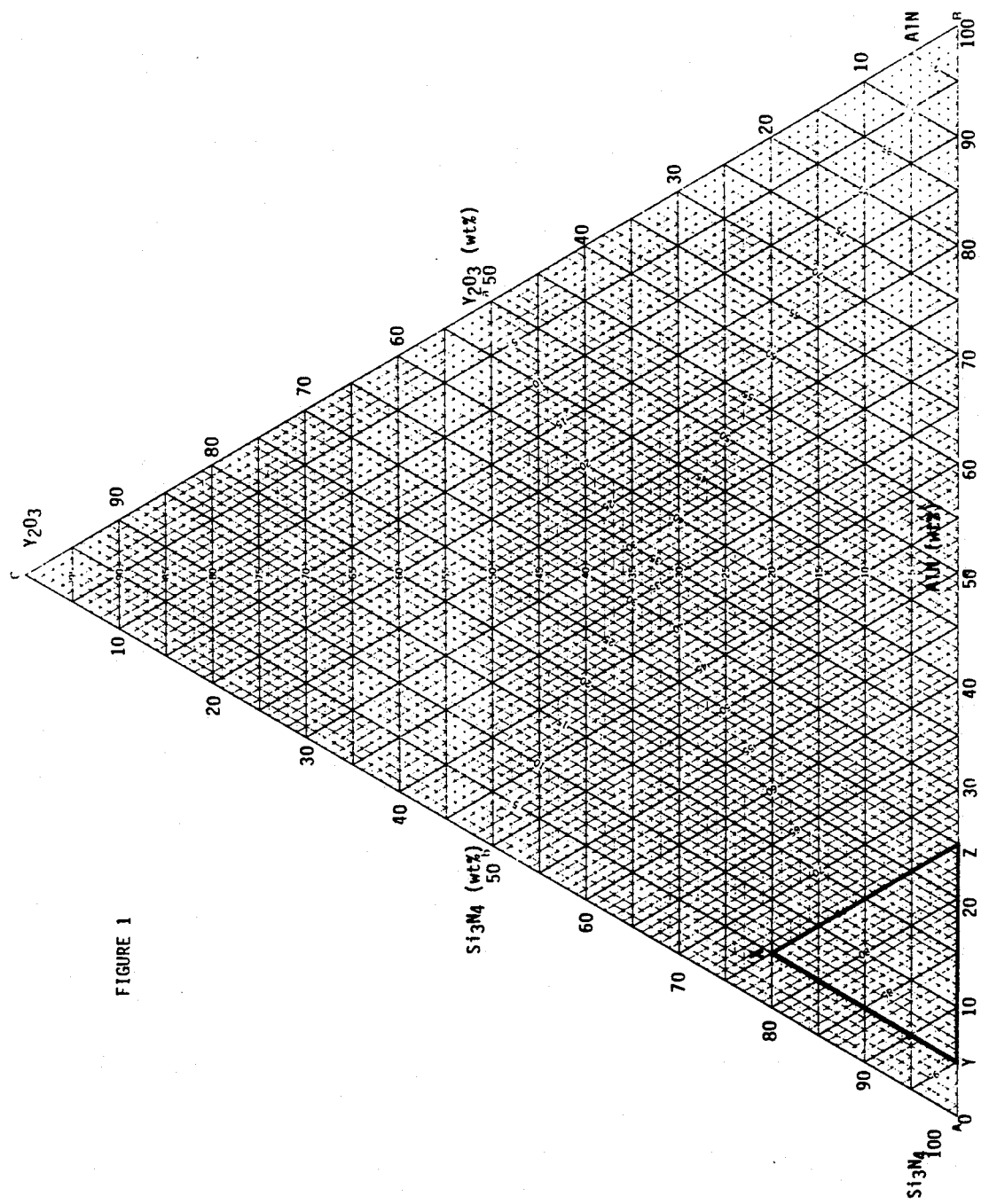
FIG. 1 is a diagram of the quasiternary system $Si_3N_4$-AlN-$Y_2O_3$.
Figure 2:
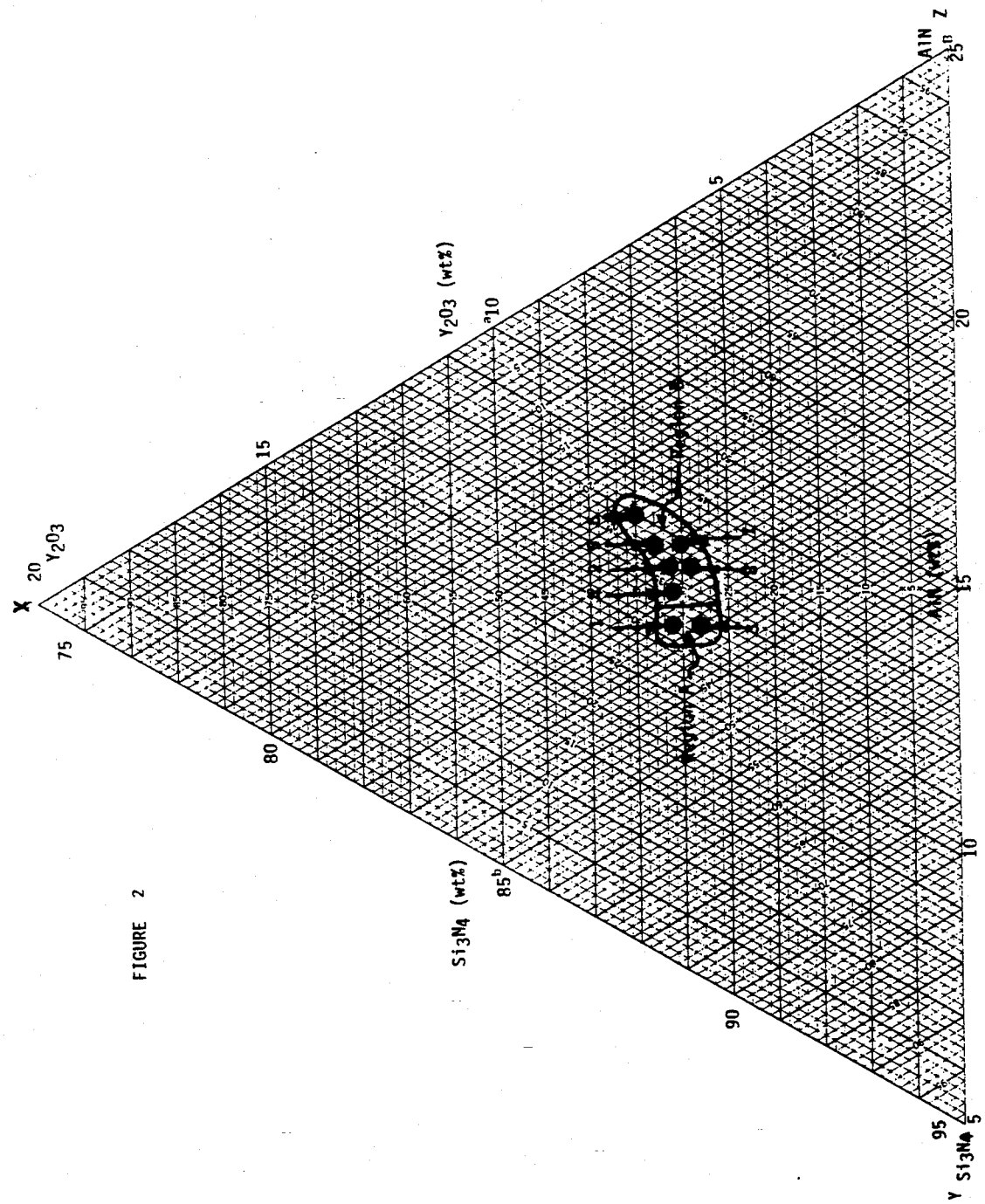
FIG. 2 is an expanded version of triangle XYZ of FIG. 1 and shows the location of pressureless sintered sialon compositions in accordance with this invention.

Examples 1 and 3, which are within Region A in FIG. 2, contained at least about 75% of the alpha prime phase sialon, the balance (excluding the previously mentioned small amount of intergranular phase) being beta silicon nitride.

Examples 2 and 4–8, which are within Region B in FIG. 2, were about 100% alpha prime phase sialon (again excluding intergranular), the amount of beta phase that is present and determinable by x-ray diffraction being none or negligible.

Table II shows the x-ray diffraction data, in $2\theta$, for alpha prime phase sialon, beta silicon nitride, Example 1 and Example 2. In Table II, VS means very strong, S strong, MS medium to strong, M medium, MW medium to weak, W weak, VW very weak.

TABLE II

| Alpha Prime | | Beta $Si_3N_4$ | | Example 1 | | Example 2 | |
|---|---|---|---|---|---|---|---|
| 13.10 | (W) | 13.35 | (MW) | | | | |
| 20.4 | (S) | | | 20.25 | (M) | 20.4 | (M) |
| 22.77 | (M) | 23.25 | (MW) | | | 22.6 | (W) |
| 26.35 | (MW) | 26.9 | (S) | | | 26.4 | (W) |
| 30.75 | | | | | | 30.62 | (S) |
| | | 33.6 | (VS) | 33.4 | (W) | | |
| 34.20 | (S) | | | 34.0 | (S) | 34.05 | (S) |
| 35.1 | (S) | | | 35.0 | (S) | 34.95 | (S) |
| | | | | 35.9 | (MW) | | |
| | | 36.0 | (VS) | | | | |
| 38.6 | (MS) | 38.9 | (W) | 38.6 | (M) | 38.5 | (M) |
| 39.2 | (VW) | | | | | 39.1 | (W) |
| 39.9 | (W) | | | | | 39.8 | (W) |
| 41.5 | (W) | 41.4 | (M) | 41.45 | (W) | 41.35 | (W) |
| 43.17 | (MS) | | | 43.2 | (MW) | 43.1 | (MW) |
| 46.5 | (W) | | | | | 46.4 | (W) |
| 47.7 | (MW) | 47.75 | (W) | | | 47.7 | (W) |
| 48.5 | (MW) | 48.05 | (W) | | | 48.8 | (W) |
| 51.3 | | 49.9 | (MW) | | | 51.2 | (W) |

TABLE II-continued

| Alpha Prime | | Beta Si3N4 | | Example 1 | | Example 2 | |
|---|---|---|---|---|---|---|---|
| 55.6 | (VW) | 52.1 | (M) | | | | |
| 57.23 | (MW) | 57.8 | (MW) | 57.35 | (MW) | 57.15 | (W) |
| 59.0 | (VW) | 59.65 | (W) | | | | |
| 59.6 | (VW) | | | | | | |
| 60.85 | (W) | 61.25 | (M) | | | | |
| 62.0 | (MW) | | | 62.05 | (W) | 61.95 | (MW) |
| | | 63.9 | (M) | | | | |
| 64.05 | (MW) | 64.8 | (MW) | | | | |
| 64.2 | (MW) | | | 64.2 | (W) | 64.15 | (MW) |
| 65.3 | (MW) | | | 65.65 | (W) | 65.25 | (W) |
| 65.65 | (W) | | | | | | |
| 68.90 | (MW) | 69.1 | (VW) | 69.05 | (W) | 68.9 | (MW) |
| 70.05 | (W) | 70.1 | (VS) | | | | |
| 72.0 | (W) | 70.8 | (MW) | | | | |
| | | 71.6 | (MW) | | | | |

In FIG. 2, as material composition moves from left to right, that is, from Region A to Region B, the beta silicon nitride content diminishes. At $Y_2O_3$ concentrations lower than those of Regions A and B, the compositions did not pressureless sinter to a high density at 1780° C. Compositions to the right of Region B could be pressureless sintered to a good density, but they were very susceptible to pores.

I claim:

1. A pressureless sintered silicon aluminum oxynitride article having high density and high hardness and having a composition which contains about 100 weight percent of alpha prime phase sialon and is located in Region B of the quasiternary system $Si_3N_4$-AlN-$Y_2O_3$ shown in FIG. 2.

* * * * *